United States Patent

Kumada

[11] Patent Number: 5,475,496
[45] Date of Patent: Dec. 12, 1995

[54] IMAGE PROCESSING APPARATUS FOR BINARIZING MULTI-VALUE IMAGE DATA

[75] Inventor: Shuichi Kumada, Yokohama, Japan

[73] Assignee: Canon Kabushiki Kaisha, Tokyo, Japan

[21] Appl. No.: 110,767

[22] Filed: Aug. 23, 1993

Related U.S. Application Data

[63] Continuation of Ser. No. 739,245, Aug. 1, 1991, abandoned.

[30] Foreign Application Priority Data

Aug. 3, 1990 [JP] Japan ................................ 2-206551

[51] Int. Cl.⁶ .......................... H04N 1/405; H04N 1/56; H04N 1/64
[52] U.S. Cl. .................. 358/298; 358/521; 358/523; 358/524
[58] Field of Search ................. 358/296, 298, 358/401, 406, 444, 457, 504, 515, 518, 521, 523, 524, 527, 528, 530

[56] References Cited

U.S. PATENT DOCUMENTS

| | | | |
|---|---|---|---|
| 4,004,079 | 1/1977 | Boston | 358/256 |
| 4,005,475 | 1/1977 | Knop | 358/80 |
| 4,084,196 | 4/1978 | Tisue et al. | 358/283 |
| 4,724,446 | 2/1988 | Hirahara et al. | 358/298 X |
| 4,860,119 | 8/1989 | Maniwa et al. | 358/296 |
| 4,866,533 | 9/1989 | Nagashima | 358/298 X |
| 4,878,063 | 10/1989 | Katerberg | 358/75 X |
| 4,918,622 | 4/1990 | Granger et al. | 364/518 |
| 4,953,012 | 8/1990 | Abe | 358/75 |
| 4,987,484 | 1/1991 | Ikeda et al. | 358/75 |
| 5,038,208 | 8/1991 | Ickikawa et al. | 358/78 X |
| 5,057,914 | 10/1991 | Tsuji et al. | 358/78 |
| 5,105,266 | 4/1992 | Telle | 358/78 X |

FOREIGN PATENT DOCUMENTS

| | | |
|---|---|---|
| 1597773 | 5/1970 | Germany . |
| 2117208 | 10/1983 | United Kingdom . |

OTHER PUBLICATIONS

Goertzel, et al., "Digital Halftoning on the IBM 4250 Printer", IBM Journal of Research and Development, 31, (1987) Jan., No. 1, pp. 2–15, Armonk, N.Y., USA.

Klensch, et al., "Electronically Generated Halftone Pictures", RCA Review, Sep. 1970, pp. 517–533.

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing apparatus having a process of binarizing a multi-value image data includes a unit for inputting a multi-value image data and first pattern information for a binarization process; a first memory for storing the first pattern information; and a binarizing unit for binarizing the inputted multi-value image data using the first pattern information stored in the first memory. The apparatus further includes a second memory for storing in advance second pattern information, wherein the apparatus has a first mode during which the inputted multi-value image data is binarized using the first pattern information, and a second mode during which the inputted multi-value image data is binarized using the second pattern information.

21 Claims, 9 Drawing Sheets

FIG. 4
(1)
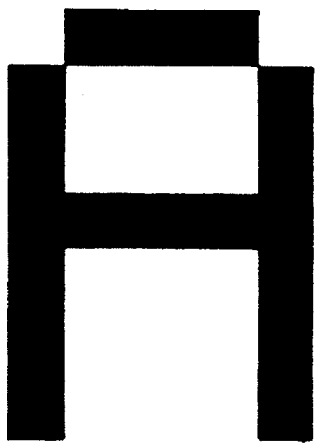
(2)
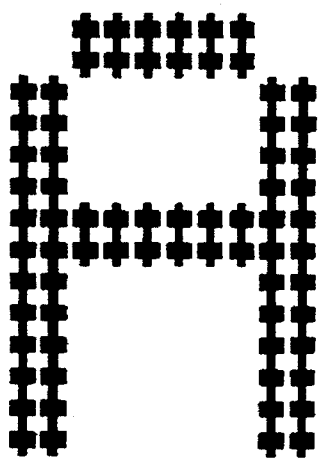
(3)
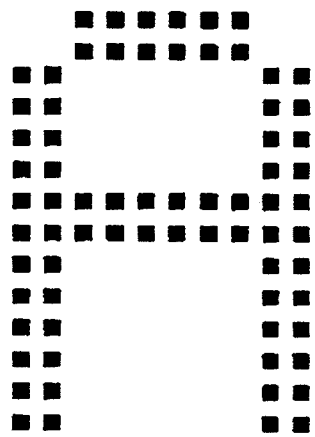

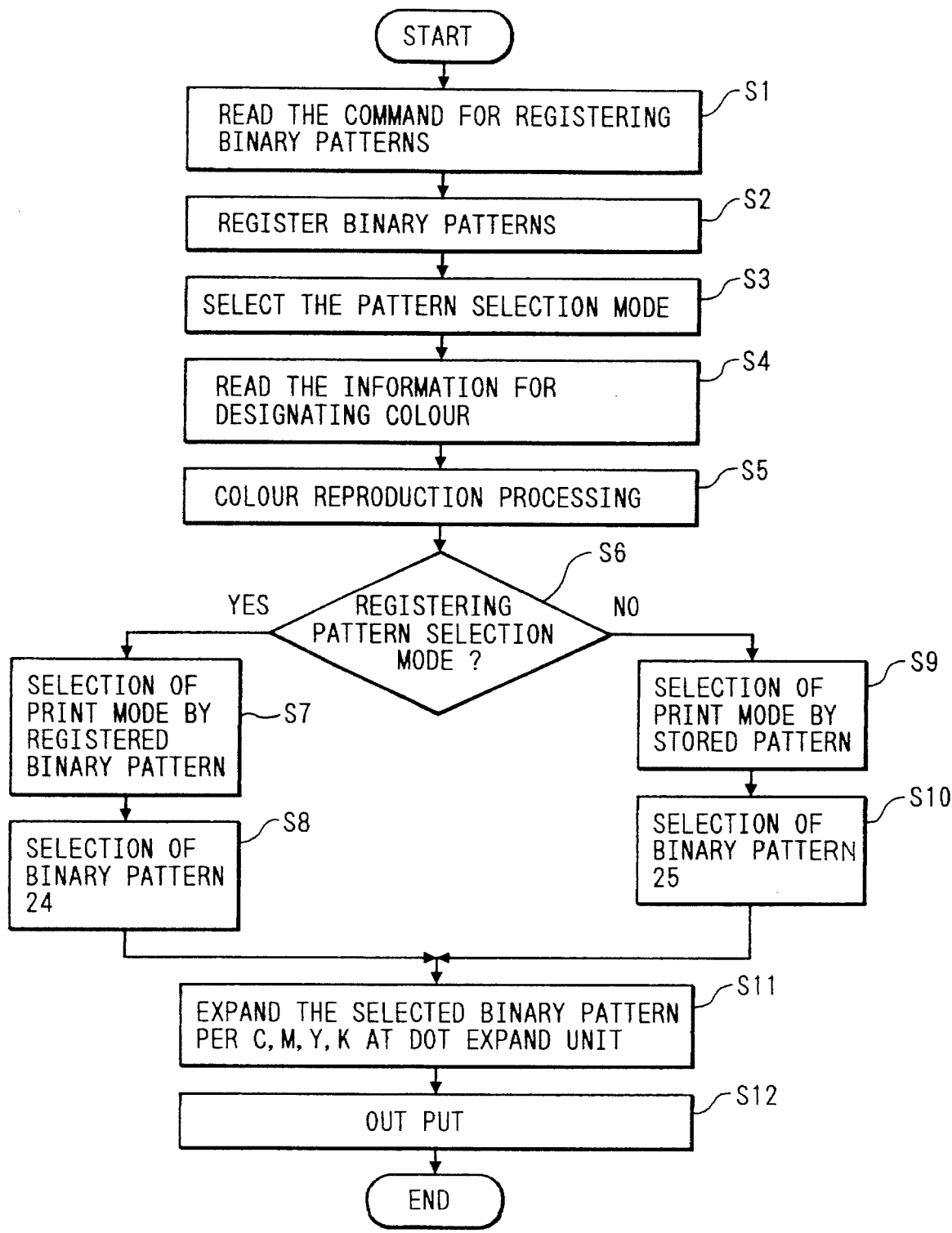

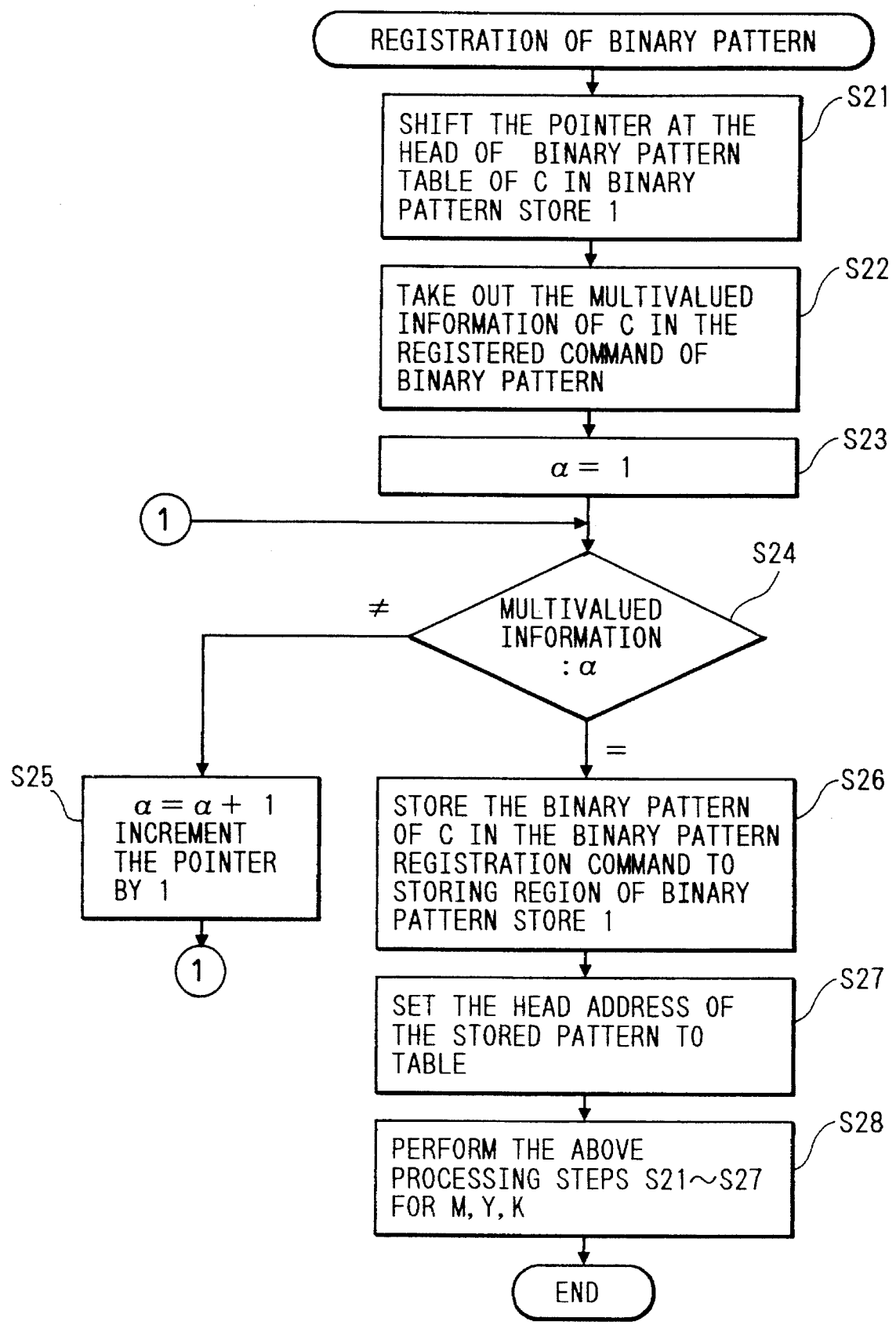

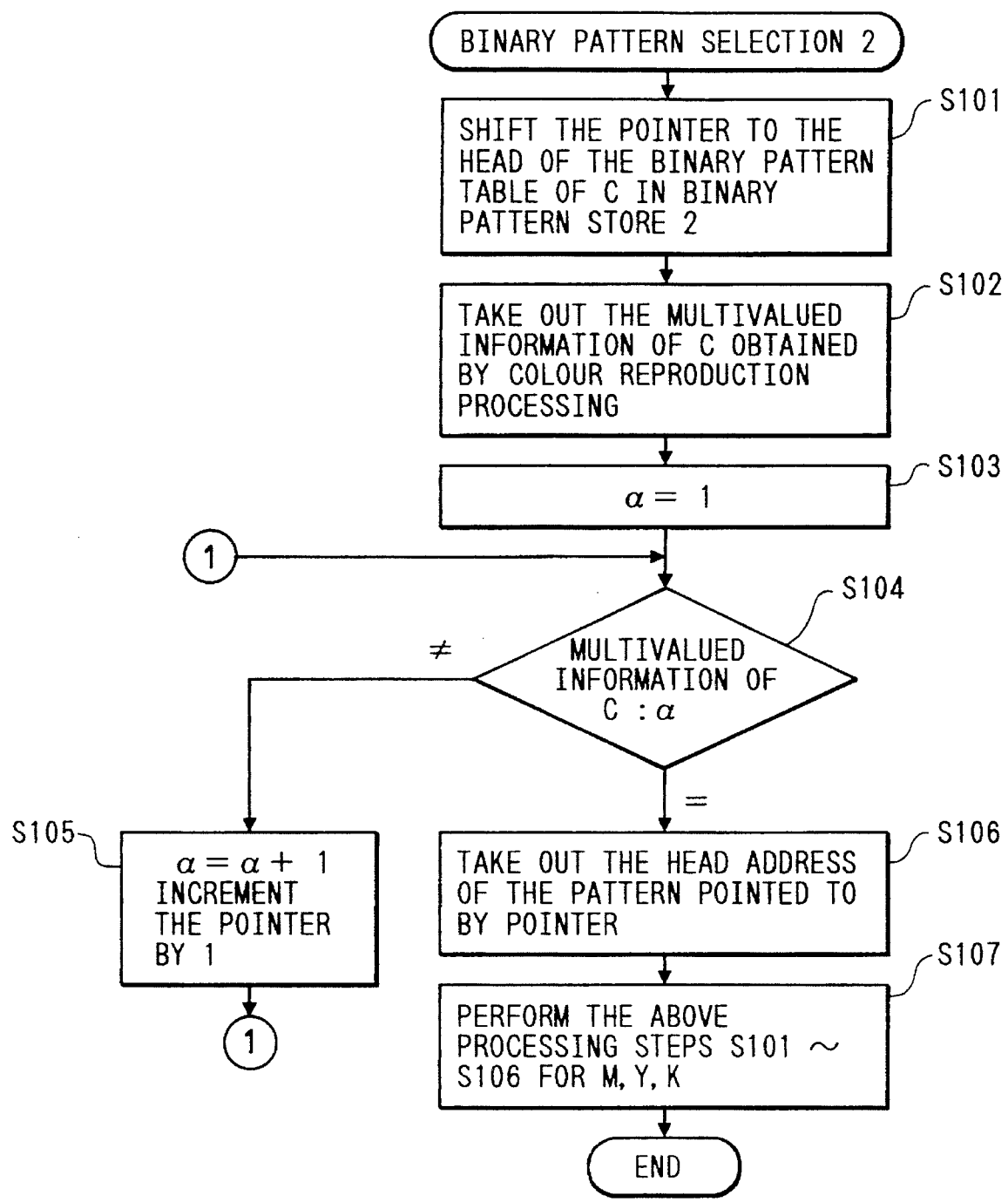

IMAGE PROCESSING APPARATUS FOR BINARIZING MULTI-VALUE IMAGE DATA

This application is a continuation of application Ser. No. 07/739,245, filed Aug. 1, 1991, now abandoned.

BACKGROUND OF THE INVENTION

1. Field of the Invention

The present invention relates to an image processing apparatus suitable particularly for color printing, wherein an inputted multi-value image data is binarized to output an image such as characters, graphics, and the like.

2. Related Background Art

In a conventional printing apparatus wherein an inputted multi-value image data is binarized to output a color image such as characters, graphics, and the like, a pattern necessary for a binarization process is generated in accordance with color designating information which designates the color of a character or the like. Specifically, a host computer generates a multi-value data representative of gradations of R (red), G (green), and B (blue), or Y (yellow), M (magenta), C (cyan), and K (black), in response to color designating commands. Upon reception of the multi-value data from the host computer, the printing apparatus generates binarization patterns of Y, M, C, and K having the designated gradations, and prints out characters or the like with designated colors.

The following disadvantages are, however, associated with the above-described related art.

(1) A large amount of color designating information is required. For example, if a complicated color image is to be printed, it becomes necessary to designate a number of colors using a corresponding number of color designating commands, and to generate patterns as many as the number of color designating commands, taking a long time for printing the image.

(2) Since the type of patterns to be generated are limited, it is not possible to generate optimum binarization patterns.

SUMMARY OF THE INVENTION

It is an object of the present invention to solve the above-described problems.

It is another object of the present invention to provide an image processing apparatus capable of providing an optimum binarization process matching the characteristics of a printing unit.

It is a further object of the present invention to provide an image processing apparatus capable of providing a high speed binarization process.

The above and other objects, and advantages of the present invention will become more apparent from the following detailed description and claims when read in connection with the accompanying drawings.

BRIEF DESCRIPTION OF THE DRAWINGS

FIGS. 4(1) to 4(3) show examples of color characters printed by using binarization patterns;

FIGS. 7 to 10 are flow charts illustrating a procedure of printing a color image by selectively using binarization patterns registered by binarization pattern registering commands or previously stored binarization patterns.

DETAILED DESCRIPTION OF THE PREFERRED EMBODIMENT

A preferred embodiment of the present invention will be described in detail with reference to the accompanying drawings.

Figure 1:
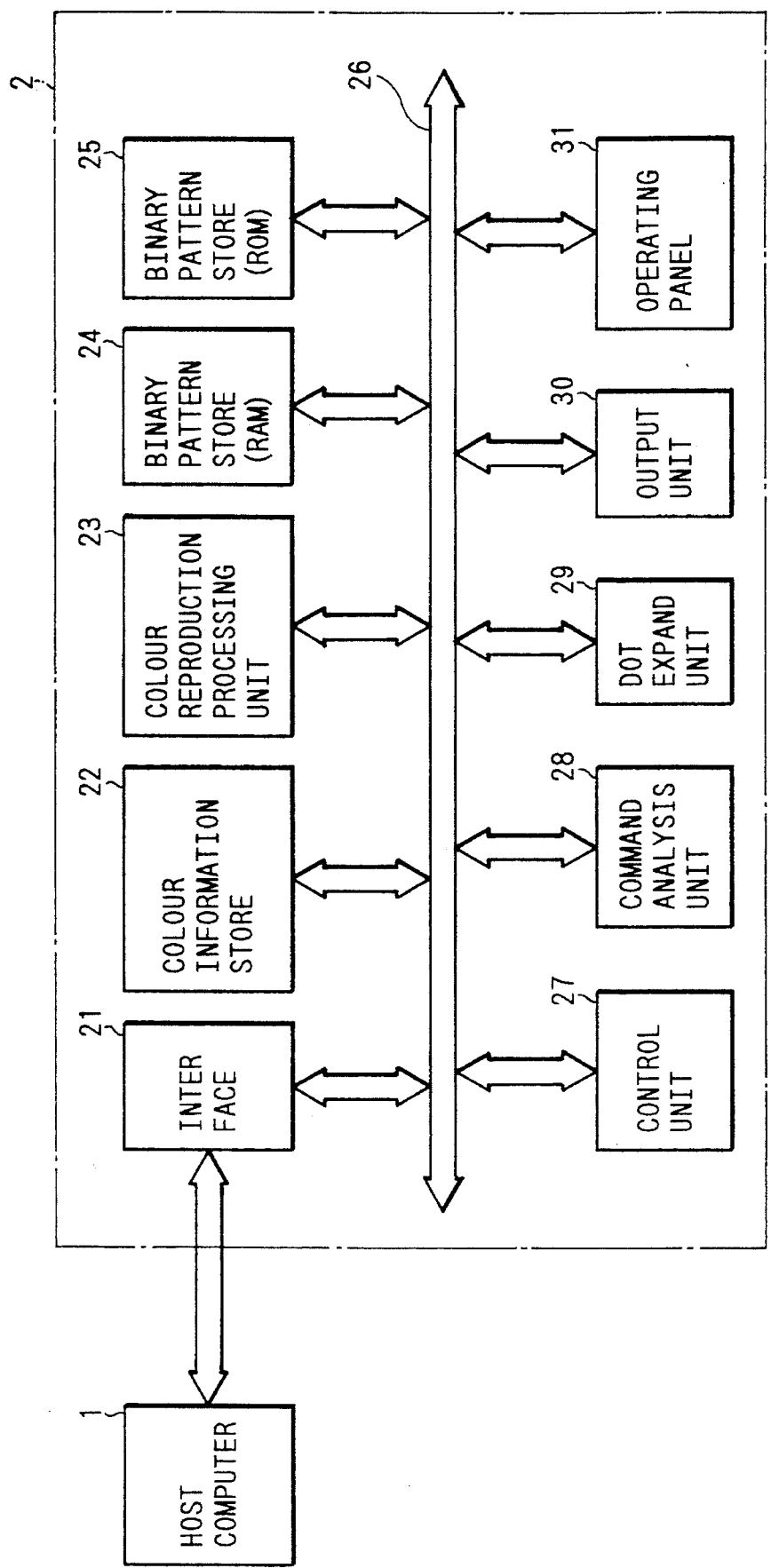
FIG. 1 is a block diagram showing the structure of a printer according to an embodiment of the present invention.

FIG. 1 is a block diagram showing the circuit arrangement of a printer according to an embodiment of the present invention.

The printer 2 is connected to a host computer 1. The host computer 1 supplies print data, print commands, and the like to the printer 2 which in turn prints a necessary image.

The printer 2 has the following elements, including: an interface 21 for data transfer to and from the host computer 1, the interface 21 being constituted by a microcomputer having a ROM and RAM; a color information storage 22 for storing information necessary for a color reproduction process; a color reproduction unit 23 for reproducing a color; a binarization pattern storage (RAM) 24 for storing binarization patterns for a binarization process registered upon input of binarization pattern registering commands (color commands) from the host computer in accordance with color information of characters, graphics, or the like to be printed; a binarization pattern storage (ROM) 25 for storing binarization patterns already generated and built in the printer; a data bus 26; a control unit 27 for controlling the entirety of the printer; a command analysis unit 28 for analyzing print data and binarization pattern registering commands supplied from the host computer 1; a dot expand unit 29 for developing a color image data processed by a binarization pattern into dots; an output unit 30 for printing a dot-developed data on a print sheet; and an operating panel 31 for setting and changing parameters of printing conditions. The output unit 30 prints out a color image by means of an electrophotographic method, an ink jet method, or the like.

Figure 2:
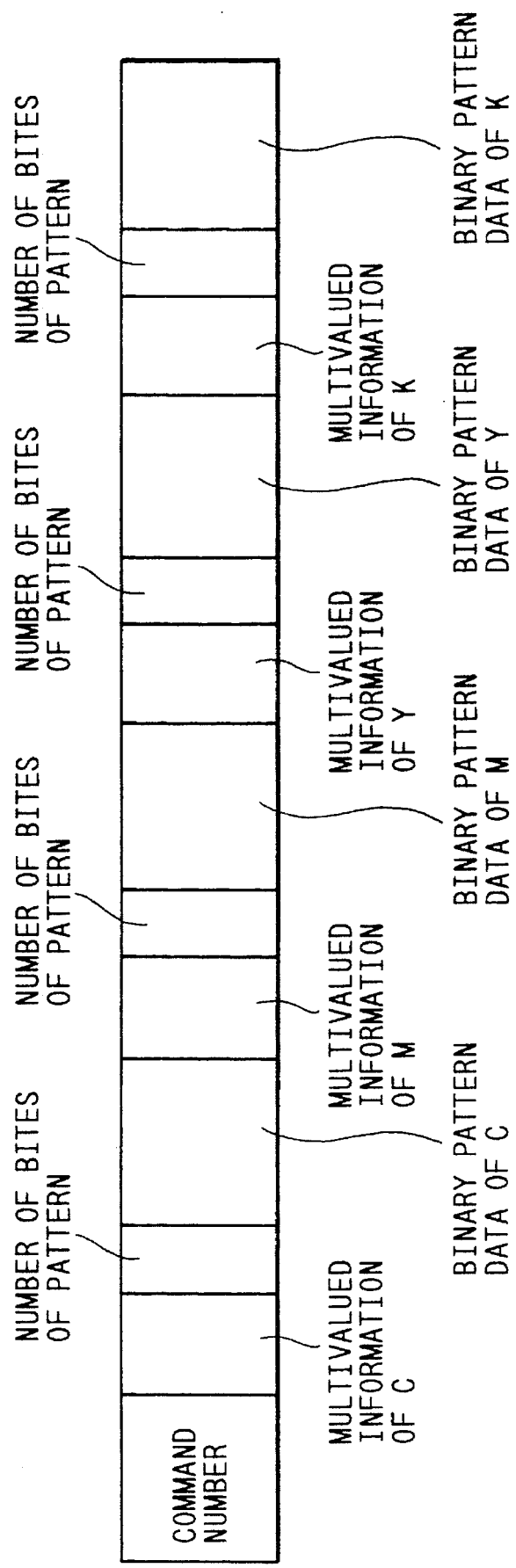
FIG. 2 shows an example of a binarization pattern registering command.

FIG. 2 shows an example of the binarization pattern registering command (color command) sent from the host computer to the printer. The color command is constructed of density information (multi-value levels) and corresponding binarization pattern data for respective colors of C, M, Y, K. In this embodiment, for an image of 64 gradations for example, 64 color commands are used at the initial setting to sequentially output a binarization pattern for each multi-value level. After the initial setting, a pattern at a desired gradation only may be changed, or a pattern for a desired color only may be changed. The size of the pattern may be different from that of a binarization pattern stored in ROM 25. Patterns having different sizes between colors may be registered.

In this embodiment, the pattern size is set to 8×8 (pixels) allowing a reproduction of 64 gradations. Such binarization patterns are provided for Y, M, C, and K, respectively.

Figure 3:
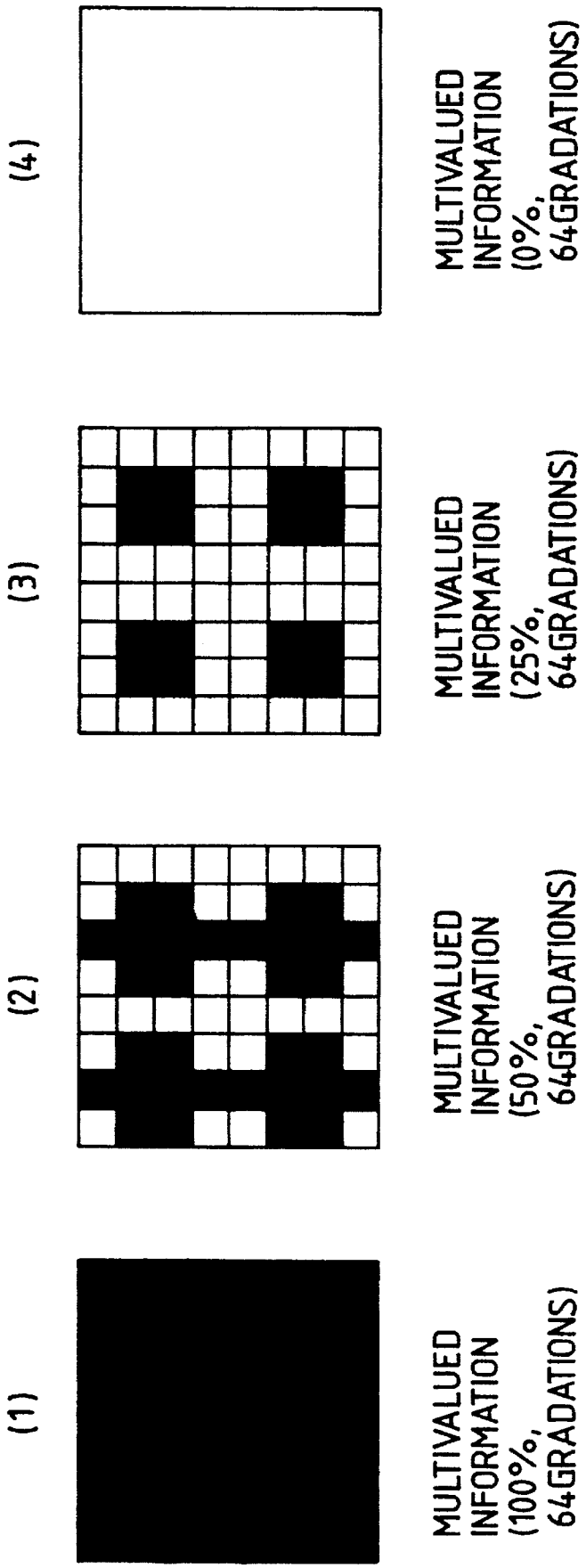
FIGS. 3(1) to 3(4) show examples of binarization patterns.

FIG. 4 shows printed characters "A" using the binarization patterns shown in FIG. 3. In this example, the gradations of C, M, Y, and K are designated as 100%, 50%, 25%, and 0%, respectively using the patterns shown in FIGS. 3(1)

to 3(4). The binarization patterns shown in FIGS. 3(1) to 3(3) are developed in paint memories of C, M, and Y. The resultant character "A" has a mixed color of C, M, and Y. Since the binarization pattern for K is blank, no image is developed in the paint memory of K.

Figure 5:
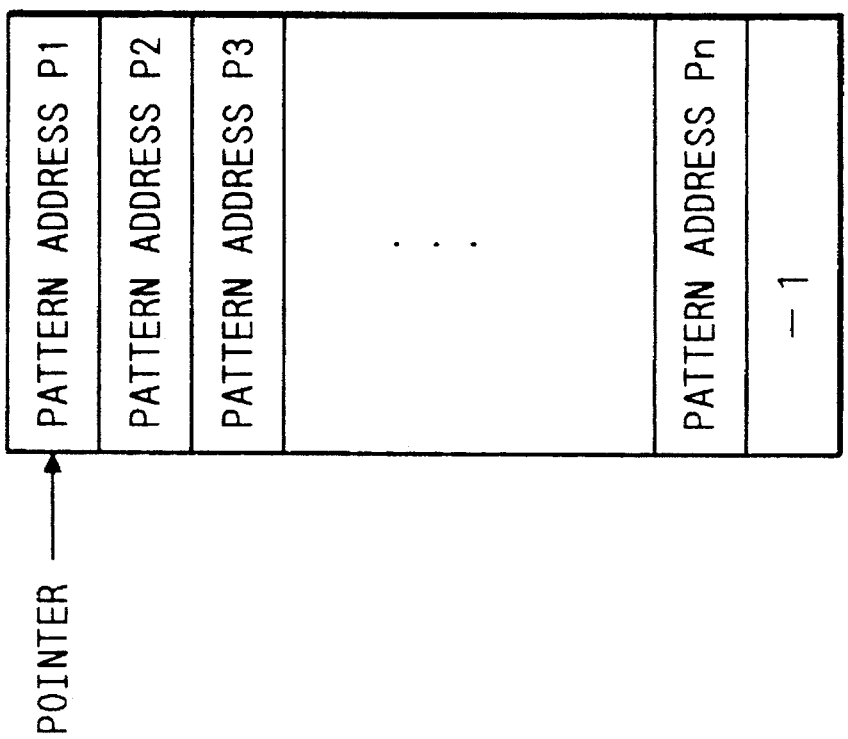
FIG. 5 is a binarization pattern table in a binarization pattern storage 1.

FIG. 5 shows a binarization pattern table of the binarization pattern storage (RAM) 24. The binarization pattern table shown in FIG. 5 is prepared for each C, M, Y, and K. Each table stores pattern addresses Pi (i= 1, 2, ..., n) each represented by a pointer to a binarization pattern, the binarization pattern being prepared for each multi-value level of the density information. For example, if C has a multi-level of 64 levels (n= 64) from "0" to "63" and the value of the multi-value information of C indicates "24", then the start address of the binarization pattern for the multi-value information "24" is stored at the pattern address P24. The same is also true for M, Y, and K. The addresses may be overwritten using the binarization pattern registering command (FIG. 2) from the host computer. "−1" in the table shown in FIG. 5 represents the end of the table.

Figure 6:
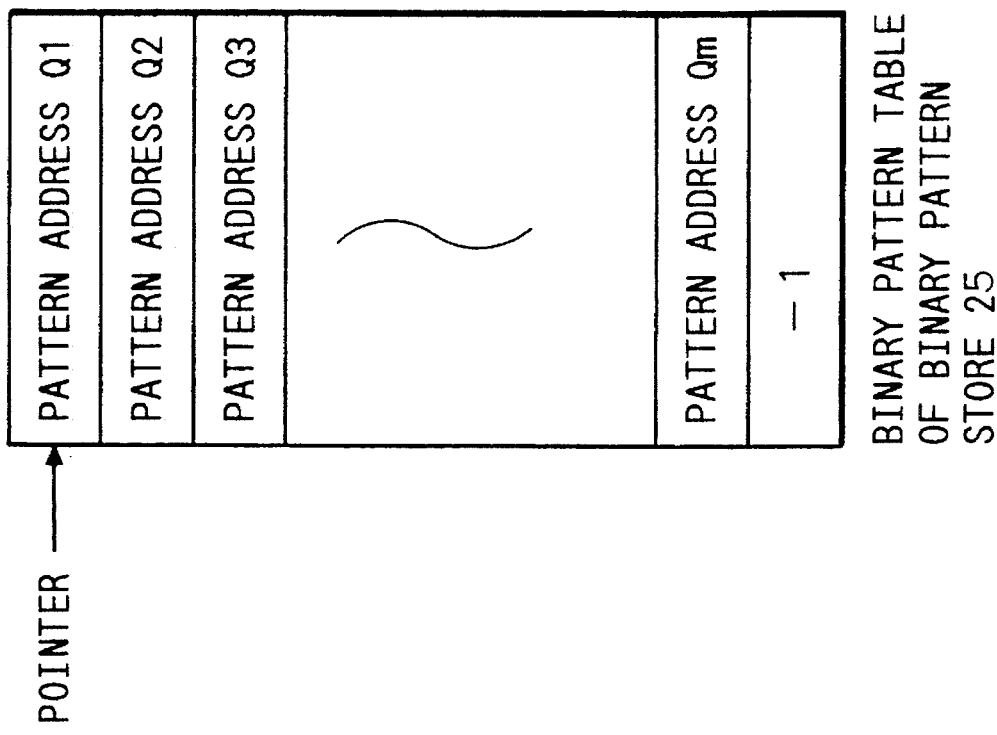
FIG. 6 shows a binarization pattern table in a binarization pattern storage 2.

FIG. 6 shows another binarization table in the binarization pattern storage (ROM) 25. The binarization pattern table shown in FIG. 5 is prepared for each C, M, Y, and K. Each table stores pattern addresses Qi (i= 1, 2, ..., n) each represented by a pointer to a binarization pattern, the binarization pattern being prepared for each multi-value level of the density information.

For example, if C has a multi-level of 256 levels (n= 256) from "0" to "255" and the value of the multi-value information of C indicates "24", then the start address of the binarization pattern for the multi-value information "24" is stored at the pattern address Q24. The same is also true for M, Y, and K. A pattern can be selected in accordance with the color designating information (multi-value information for C, M, Y, and K) from the host computer. "−1" in the table shown in FIG. 6 represents the end of the table.

FIGS. 7 to 10 are flow charts illustrating the procedure of reading a binarization pattern registering command from the host computer, registering the binarization pattern, and selecting the registered binarization pattern (first mode) or the binarization pattern stored in the printer, to print a color image of characters, graphics or the like.

First, at step S1, a binarization registering command is read. At step $2 the binarization registering pattern is analyzed at the command analysis unit 28 to register a binarization pattern.

At step S3 a pattern selection mode is selected in response to a mode selection command from the host computer 1.

At step S4 color designating information from the host computer is read, the color designating information being, for example, brightness information of designated character color R, G, B.

At step S5 a color reproduction process is executed to obtain the density information (multi-value level) of C, M, Y, and K. The color reproduction process includes a process of converting brightness information of R, G, and B into density information of C, M, Y, and K, a masking process of eliminating the influence of unnecessary absorption characteristics of tone or ink of C, M, and Y, a process of adjusting contrast, brightens or the like, and other processes.

At step S6, the pattern selection mode selected at step S3 is checked.

If the registered pattern selection mode is selected (step S7), then at step S8 the registered binarization pattern 24 is selected. If the stored pattern selection mode is selected (step S10), the stored binarization pattern 25 is selected.

At step S11, in accordance with the binarization pattern selected at step S8 or S10, the dot expand unit develops the image data into dots, respectively for C, M, Y, and K. At step S12, a color image is outputted. The selection between the two modes may be carried out even on the same print sheet.

The process at step S2 will be detailed with reference to the flow chart of FIG. 8.

First, at step S21 a pointer is shifted to the top of the binarization pattern table for C in the binarization pattern storage 24.

At step S22 the multi-value information (e.g., a value "24" of a multi-value level including 64 levels from "0" to "63") for C is taken out from the binarization pattern registering command.

At step S23 "1" is set to a constant $\alpha$.

At step S24 the constant $\alpha$ is compared with the multi-value information for C taken out at step S22.

If the both values are not equal, at step S25 the value $\alpha$ and the pointer each are incremented by 1, and thereafter the control returns to step S24.

If the both values are equal, at step S26 the binarization pattern for C in the binarization pattern registering command is registered in a pattern storage area of the binarization pattern storage 24. At step S27, the start address of the registered pattern is set to the table. At step S28, the same processes as at steps S21 to 27 are executed for M, Y, and K.

Figure 9:
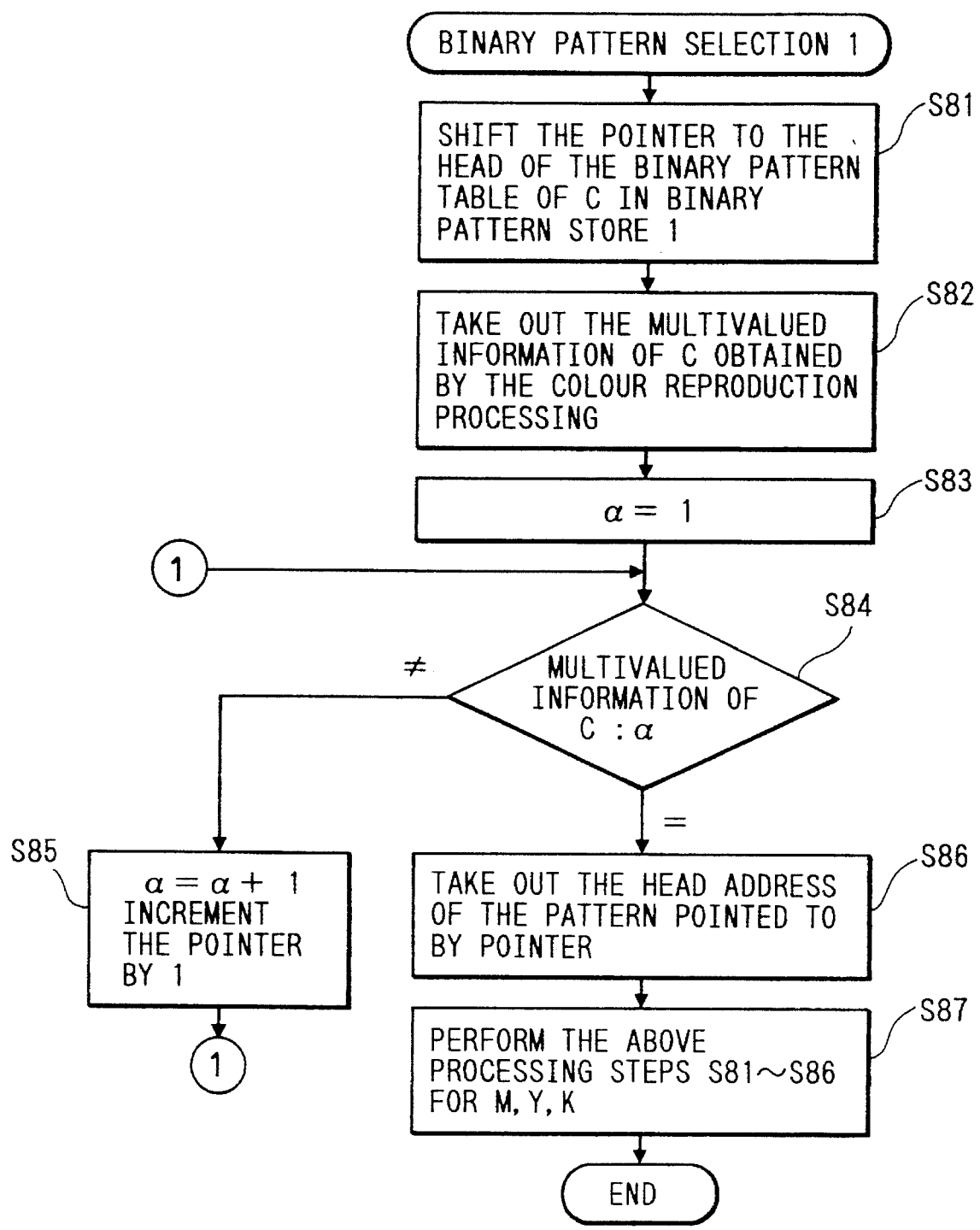

The process at step S8 will be detailed with reference to the flow chart shown in FIG. 9.

First, at step S81 the pointer is shifted to the top of the binarization pattern table for C in the binarization pattern storage 24.

At step S82 there is taken out the multi-value information (e.g., a value "24" of the multi-value level having 64 levels from "0" to "63") obtained at step S5.

At step S83 "1" is set to a constant $\alpha$.

At step S84 the constant $\alpha$ is compared with the multi-value information for C taken out at step S82.

If the both values are not equal, at step S85 the value $\alpha$ and the pointer each are incremented by 1, and thereafter the control returns to step S84.

If the both values are equal, at step S86 the start address of the binarization pattern indicated by the pointer is taken out.

At step S87, the same processes as at steps S81 to 87 are executed for M, Y, and K.

Next, the process at step S10 will be detailed with reference to the flow chart shown in FIG. 10.

First, at step S101 the pointer is shifted to the top of the binarization pattern table for C in the binarization pattern storage 25.

At step S102 there is taken out the multi-value information obtained at step S5.

At step S103 "1" is set to a constant $\alpha$.

At step S104 the constant $\alpha$ is compared with the multi-value information for C taken out at step S102.

If the both values are not equal, at step S105 the value $\alpha$ and the pointer each are incremented by 1, and thereafter the control returns to step S104.

If the both values are equal, at step S106 the start address of the binarization pattern indicated by the pointer is taken out.

At step S107, the same processes as at steps S101 to 106 are executed for M, Y, and K.

As described so far, this embodiment allows to register a binarization pattern inputted from the host computer. One of the registered pattern of the stored pattern built-in the printer is selected to print out a color image of characters, graphics or the like.

In the above-described embodiment, the pattern selection mode is selected by the host computer. The pattern selection mode may be selected using the operating panel of the printer.

In the above embodiment, the size of the registered binarization pattern or the built-in binarization pattern may be set arbitrarily.

Furthermore, one of the registered binarization pattern or the built-in binarization pattern for each color and each multi-value level may be selectively used.

As appreciated from the foregoing description of the present invention, the process time required for printing can be shortened by providing a binarization pattern previously stored. Furthermore, by providing a binarization pattern suitable for a particular printer, it becomes possible to realize a proper color reproduction. Still further, a binarization pattern is inputted from the host computer, resulting in various types of color reproduction.

The present invention is not limited to the above embodiment, but various modifications are possible without departing from the scope of the present invention. For example, in a test printing, the same multi-value data may be printed on the same print sheet using the two modes. A current mode may be displayed on a panel or maybe returned back to the host computer. An area for image printing may be designated by a particular mode. A particular image area such as an image edge portion may be separated to change a mode only for such an image area. A plurality set of binarization pattern data may be stored in ROM 25 or RAM 24 to select one of three modes or more.

I claim:

1. An image processing apparatus for converting multi-value pixel data representing a gradation, outputted from a host computer, into binarized pixel data, said apparatus comprising:

means for inputting from the host computer first pattern information for a binarization process;

first storage means for storing said first pattern information inputted by said inputting means; and binarizing means for binarizing inputted multi-value pixel data using said first pattern information stored in said first storage means, and for generating the binarized pixel data.

2. An apparatus according to claim 1, further comprising second storage means for storing in advance second pattern information, wherein said apparatus has a first mode during which said inputted multi-value pixel data is binarized using said first pattern information, and a second mode during which said inputted multi-value pixel data is binarized using said second pattern information.

3. An apparatus according to claim 2, wherein said second storage means is a ROM.

4. An apparatus according to claim 2, wherein said first pattern information and said second pattern information include patterns in correspondence with gradations represented by said multi-value pixel data.

5. An apparatus according to claim 4, wherein said binarizing means reads out a pattern corresponding to a gradation represented by said inputted multi-value pixel data from one of said first storage means and said second storage means.

6. An apparatus according to claim 2, further comprising selecting means for selecting one of said first mode and said second mode.

7. An apparatus according to claim 6, wherein said selecting means is manually selectable between one of said first mode and said second mode.

8. An apparatus according to claim 6, wherein said selecting means selects one of said first mode and said second mode in accordance with a command sent from said host computer.

9. An apparatus according to claim 2, wherein in a test printing, said apparatus prints a same multi-value pixel data on a same print sheet using both of said first mode and said second mode.

10. An apparatus according to claim 2, wherein said first storage means stores said first pattern information having a pattern size different from that of said second pattern information stored in said second storage means.

11. An apparatus according to claim 2, further comprising display means for displaying a current mode.

12. An apparatus according to claim 2, wherein said apparatus prints an image on a predetermined area of a print sheet in a particular mode.

13. An apparatus according to claim 12, wherein said predetermined area or said particular mode is designated by an operator.

14. An apparatus according to claim 12, further comprising means for detecting, as said predetermined area, an edge portion of an image to be printed.

15. An apparatus according to claim 1, wherein said apparatus comprises a color image processing apparatus, and said first storage means stores said first pattern information for each color component.

16. An apparatus according to claim 15, wherein said apparatus stores said first pattern information in which each color has a different pattern size.

17. An image processing apparatus for outputting binarized pixel data converted from multi-value pixel data supplied from an external apparatus, said apparatus comprising:

input means for inputting from said external apparatus multi-value pixel data representing a first gradation value and first binarization patterns, said first binarization patterns corresponding to a second gradation value;

a register for registering the first binarization patterns inputted by the input means; and a ROM, for storing in advance, a second binarization pattern corresponding to each of the first gradation value and the second gradation value, wherein, after the first binarization patterns are registered in said register, said apparatus is operable in a first mode during which said apparatus outputs the binarized pixel data by using said first binarization patterns and a second mode during which said apparatus outputs the binarized pixel data by using said second binarization pattern.

18. An apparatus according to claim 17, wherein said apparatus comprises a color printer, and wherein said register stores said first binarization patterns in which each color has different binarization patterns.

19. An apparatus according to claim 18, wherein said register stores said first binarization patterns having pattern sizes different for each color.

20. An apparatus according to claim 6, wherein said selecting means selects said second mode when the first pattern information is stored in the first storage means.

21. A printing apparatus according to claim 17, further comprising means for selecting either one of the first mode and the second mode, wherein said selection means selects said second mode when the first binarization patterns are stored in said register.

* * * * *